(12) United States Patent
Chan et al.

(10) Patent No.: US 8,510,334 B2
(45) Date of Patent: Aug. 13, 2013

(54) LOCK MANAGER ON DISK

(75) Inventors: Wilson Wai Shun Chan, San Mateo, CA (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 310 days.

(21) Appl. No.: 12/613,502

(22) Filed: Nov. 5, 2009

(65) Prior Publication Data

US 2011/0106778 A1    May 5, 2011

(51) Int. Cl.
*G06F 7/00* (2006.01)
*G06F 17/30* (2006.01)

(52) U.S. Cl.
USPC ............ 707/781; 707/802; 707/610; 710/200

(58) Field of Classification Search
USPC .................. 710/200; 711/163, 100; 700/79; 714/4.21
See application file for complete search history.

(56) References Cited

U.S. PATENT DOCUMENTS

| | | |
|---|---|---|
| 4,438,494 A | 3/1984 | Budde et al. |
| 4,814,971 A | 3/1989 | Thatte |
| 4,827,411 A | 5/1989 | Arrowood et al. |
| 4,873,517 A | 10/1989 | Baratz et al. |
| 4,914,571 A | 4/1990 | Baratz et al. |
| 4,962,533 A | 10/1990 | Krueger et al. |
| 4,972,437 A | 11/1990 | Citron et al. |
| 5,025,365 A | 6/1991 | Mathur et al. |
| 5,101,348 A | 3/1992 | Arrowood et al. |
| 5,109,483 A | 4/1992 | Baratz et al. |
| 5,193,162 A | 3/1993 | Bordsen et al. |
| 5,276,835 A | 1/1994 | Mohan et al. |
| 5,276,848 A | 1/1994 | Gallagher et al. |
| 5,280,611 A | 1/1994 | Mohan et al. |
| 5,285,528 A | 2/1994 | Hart |
| 5,287,473 A | 2/1994 | Mohan et al. |
| 5,297,269 A | 3/1994 | Donaldson et al. |
| 5,313,051 A | 5/1994 | Brigida et al. |
| 5,319,773 A | 6/1994 | Britton et al. |

(Continued)

FOREIGN PATENT DOCUMENTS

| | | |
|---|---|---|
| CA | 2435388 A1 | 1/2003 |
| EP | 0483424 A1 | 10/1990 |

(Continued)

OTHER PUBLICATIONS

Abstracts of Some of C. Mohan's Papers and Patents, Updated on Jun. 13, 2001, www.almaden.ibm.com/u/mohan/aries_papers.html, accessed Jul. 24, 2001, 36 pages.

(Continued)

*Primary Examiner* — Rehana Perveen
*Assistant Examiner* — Raheem Hoffler
(74) *Attorney, Agent, or Firm* — Hickman Palermo Truong Becker Bingham Wong LLP (57) ABSTRACT

A method and apparatus for managing shared resources in a clustered database management system is provided. In an embodiment, multiple master nodes exist in a database management system. A master node receives a lock request from a second node. The lock request is a request for a lock on a shared resource. The master node grants the lock request to the second node. While the second node holds the lock, the second node causes the master node to modify the shared resource.

20 Claims, 4 Drawing Sheets

(56) References Cited

U.S. PATENT DOCUMENTS

| | | |
|---|---|---|
| 5,327,556 A | 7/1994 | Mohan et al. |
| 5,371,885 A | 12/1994 | Letwin |
| 5,408,629 A | 4/1995 | Tsuchiya et al. |
| 5,410,697 A | 4/1995 | Baird et al. |
| 5,414,840 A | 5/1995 | Rengarajan et al. |
| 5,423,037 A | 6/1995 | Hvasshovd |
| 5,423,044 A * | 6/1995 | Sutton et al. .................. 710/200 |
| 5,432,926 A | 7/1995 | Citron et al. |
| 5,440,732 A | 8/1995 | Lomet et al. |
| 5,454,108 A | 9/1995 | Devarakonda et al. |
| 5,465,328 A | 11/1995 | Dievendorff et al. |
| 5,485,608 A | 1/1996 | Lomet et al. |
| 5,524,205 A | 6/1996 | Lomet et al. |
| 5,539,883 A | 7/1996 | Allon et al. |
| 5,551,046 A | 8/1996 | Mohan et al. |
| 5,555,404 A | 9/1996 | Torbjørnsen et al. |
| 5,596,754 A | 1/1997 | Lomet |
| 5,612,865 A * | 3/1997 | Dasgupta ........................ 700/79 |
| 5,613,060 A | 3/1997 | Britton et al. |
| 5,634,068 A | 5/1997 | Nishtala et al. |
| 5,634,122 A | 5/1997 | Loucks et al. |
| 5,659,682 A | 8/1997 | Devarakonda et al. |
| 5,664,151 A | 9/1997 | Galles et al. |
| 5,664,176 A | 9/1997 | Madduri |
| 5,666,532 A | 9/1997 | Saks et al. |
| 5,675,791 A | 10/1997 | Bhide et al. |
| 5,680,576 A | 10/1997 | Laudon |
| 5,682,537 A | 10/1997 | Davies et al. |
| 5,740,362 A | 4/1998 | Buickel et al. |
| 5,751,949 A | 5/1998 | Thomson et al. |
| 5,787,428 A | 7/1998 | Hart |
| 5,805,785 A | 9/1998 | Dias et al. |
| 5,829,032 A | 10/1998 | Komuro et al. |
| 5,832,484 A | 11/1998 | Sankaran et al. |
| 5,832,516 A | 11/1998 | Bamford et al. |
| 5,845,326 A | 12/1998 | Hirayama et al. |
| 5,859,966 A | 1/1999 | Hayman et al. |
| 5,872,969 A | 2/1999 | Copeland et al. |
| 5,875,462 A | 2/1999 | Bauman et al. |
| 5,892,754 A | 4/1999 | Kompella et al. |
| 5,903,910 A | 5/1999 | Tan et al. |
| 5,905,998 A | 5/1999 | Ebrahim et al. |
| 5,907,849 A | 5/1999 | Dias et al. |
| 5,913,227 A | 6/1999 | Raz et al. |
| 5,918,229 A | 6/1999 | Davis et al. |
| 5,924,096 A | 7/1999 | Draper et al. |
| 5,933,838 A | 8/1999 | Lomet |
| 5,933,849 A | 8/1999 | Srbljic et al. |
| 5,940,827 A | 8/1999 | Hapner et al. |
| 5,951,695 A | 9/1999 | Kolovson |
| 5,966,706 A | 10/1999 | Biliris et al. |
| 5,987,477 A | 11/1999 | Schmuck et al. |
| 5,991,768 A | 11/1999 | Sun et al. |
| 5,996,086 A | 11/1999 | Delaney et al. |
| 5,999,940 A | 12/1999 | Ranger |
| 6,011,918 A | 1/2000 | Cohen et al. |
| 6,012,085 A | 1/2000 | Yohe et al. |
| 6,014,669 A | 1/2000 | Slaughter et al. |
| 6,026,474 A | 2/2000 | Carter et al. |
| 6,032,188 A | 2/2000 | Mairs et al. |
| 6,052,758 A | 4/2000 | Crockett et al. |
| 6,067,550 A | 5/2000 | Lomet |
| 6,085,198 A | 7/2000 | Skinner et al. |
| 6,088,758 A | 7/2000 | Kaufman et al. |
| 6,092,157 A | 7/2000 | Suzuki |
| 6,112,281 A | 8/2000 | Bamford et al. |
| 6,115,715 A | 9/2000 | Traversat et al. |
| 6,119,244 A | 9/2000 | Schoenthal et al. |
| 6,151,607 A | 11/2000 | Lomet |
| 6,151,684 A * | 11/2000 | Alexander et al. ........... 714/4.21 |
| 6,154,811 A | 11/2000 | Srbljic et al. |
| 6,167,490 A | 12/2000 | Levy et al. |
| 6,173,374 B1 | 1/2001 | Heil et al. |
| 6,243,814 B1 | 6/2001 | Matena |
| 6,253,229 B1 | 6/2001 | Nielsen et al. |
| 6,253,273 B1 | 6/2001 | Blumenau |
| 6,256,712 B1 | 7/2001 | Challenger et al. |
| 6,272,491 B1 | 8/2001 | Chan et al. |
| 6,279,084 B1 | 8/2001 | VanDoren et al. |
| 6,289,462 B1 | 9/2001 | McNabb et al. |
| 6,304,973 B1 | 10/2001 | Williams |
| 6,311,265 B1 | 10/2001 | Beckerle et al. |
| 6,321,238 B1 | 11/2001 | Putzolu |
| 6,330,591 B1 | 12/2001 | Ducaroir et al. |
| 6,341,340 B1 | 1/2002 | Tsukerman et al. |
| 6,353,836 B1 | 3/2002 | Bamford et al. |
| 6,370,619 B1 | 4/2002 | Ho et al. |
| 6,374,264 B1 | 4/2002 | Bohannon et al. |
| 6,374,332 B1 | 4/2002 | Mackenthun et al. |
| 6,434,555 B1 | 8/2002 | Frolund et al. |
| 6,438,714 B1 | 8/2002 | Canestaro et al. |
| 6,449,623 B1 | 9/2002 | Bohannon et al. |
| 6,453,356 B1 | 9/2002 | Sheard et al. |
| 6,453,404 B1 | 9/2002 | Bereznyi et al. |
| 6,477,620 B1 | 11/2002 | Bauman et al. |
| 6,480,895 B1 | 11/2002 | Gray et al. |
| 6,490,594 B1 | 12/2002 | Lomet |
| 6,516,315 B1 | 2/2003 | Gupta |
| 6,529,906 B1 | 3/2003 | Chan |
| 6,530,035 B1 | 3/2003 | Bridge |
| 6,535,868 B1 | 3/2003 | Galeazzi et al. |
| 6,567,509 B1 | 5/2003 | Gusler et al. |
| 6,567,811 B1 | 5/2003 | Edwards et al. |
| 6,587,921 B2 | 7/2003 | Chiu et al. |
| 6,587,931 B1 | 7/2003 | Bauman et al. |
| 6,594,676 B1 | 7/2003 | Moore |
| 6,611,899 B2 | 8/2003 | Takahashi et al. |
| 6,622,263 B1 | 9/2003 | Stiffler et al. |
| 6,633,891 B1 | 10/2003 | Bamford et al. |
| 6,636,248 B1 | 10/2003 | Christensen et al. |
| 6,643,672 B1 | 11/2003 | Lebel |
| 6,647,510 B1 | 11/2003 | Ganesh et al. |
| 6,658,589 B1 | 12/2003 | Taylor |
| 6,668,295 B1 | 12/2003 | Chan |
| 6,678,798 B1 | 1/2004 | Kuskin et al. |
| 6,711,571 B2 | 3/2004 | Putzolu |
| 6,728,897 B1 | 4/2004 | Cramer et al. |
| 6,816,873 B2 | 11/2004 | Cotner et al. |
| 6,832,120 B1 | 12/2004 | Frank et al. |
| 6,873,987 B1 | 3/2005 | Novaes et al. |
| 6,915,387 B1 | 7/2005 | Huffman et al. |
| 6,920,454 B1 | 7/2005 | Chan |
| 6,928,580 B2 | 8/2005 | Pedone et al. |
| 6,978,279 B1 | 12/2005 | Lomet et al. |
| 6,981,104 B2 | 12/2005 | Prabhu |
| 7,039,828 B1 | 5/2006 | Scott |
| 7,065,540 B2 | 6/2006 | Chandrasekaran et al. |
| 7,085,911 B2 | 8/2006 | Sachedina et al. |
| 7,096,316 B1 | 8/2006 | Karr et al. |
| 7,127,633 B1 | 10/2006 | Olson et al. |
| 7,178,050 B2 | 2/2007 | Fung et al. |
| 7,266,722 B2 | 9/2007 | Kingsbury |
| 7,290,113 B2 | 10/2007 | Weinreb et al. |
| 7,330,858 B1 | 2/2008 | Karr et al. |
| 7,340,743 B1 | 3/2008 | Aural et al. |
| 7,739,677 B1 | 6/2010 | Kekre et al. |
| RE42,664 E | 8/2011 | Hallmark et al. |
| 2001/0032281 A1 | 10/2001 | Daynes |
| 2001/0039550 A1 | 11/2001 | Putzolu |
| 2002/0016795 A1 * | 2/2002 | Bamford et al. ............... 707/202 |
| 2002/0049903 A1 | 4/2002 | Ussery et al. |
| 2002/0087736 A1 | 7/2002 | Martin |
| 2002/0095403 A1 | 7/2002 | Chandrasekaran et al. |
| 2002/0143735 A1 | 10/2002 | Ayi et al. |
| 2002/0144047 A1 | 10/2002 | Loy et al. |
| 2002/0188590 A1 | 12/2002 | Curran et al. |
| 2002/0194015 A1 | 12/2002 | Gordon et al. |
| 2003/0009707 A1 | 1/2003 | Pedone et al. |
| 2003/0041215 A1 | 2/2003 | George et al. |
| 2003/0051187 A1 | 3/2003 | Mashayekhi et al. |
| 2003/0088786 A1 | 5/2003 | Moran et al. |
| 2003/0154236 A1 | 8/2003 | Dar et al. |
| 2003/0220974 A1 | 11/2003 | Curran et al. |
| 2003/0229650 A1 | 12/2003 | Olstad et al. |

| | | | |
|---|---|---|---|
| 2004/0078396 | A1 | 4/2004 | Lebel |
| 2004/0098371 | A1 | 5/2004 | Bayliss et al. |
| 2004/0098390 | A1 | 5/2004 | Bayliss et al. |
| 2004/0117345 | A1 | 6/2004 | Bamford et al. |
| 2004/0172422 | A1 | 9/2004 | Putzolu |
| 2004/0172508 | A1 | 9/2004 | Nguyen et al. |
| 2004/0199734 | A1* | 10/2004 | Rajamani et al. ............. 711/163 |
| 2004/0205206 | A1 | 10/2004 | Naik et al. |
| 2004/0215640 | A1 | 10/2004 | Bamford et al. |
| 2004/0225742 | A1 | 11/2004 | Loaiza et al. |
| 2005/0010615 | A1 | 1/2005 | Cypher et al. |
| 2005/0065907 | A1 | 3/2005 | Chandrasekaran et al. |
| 2005/0149540 | A1 | 7/2005 | Chan et al. |
| 2005/0203961 | A1* | 9/2005 | Mehra et al. .................. 707/200 |
| 2005/0203974 | A1* | 9/2005 | Smith et al. .................. 707/204 |
| 2006/0143350 | A1 | 6/2006 | Miloushev et al. |
| 2006/0212573 | A1 | 9/2006 | Loaiza et al. |
| 2006/0248127 | A1* | 11/2006 | Whitehouse ................. 707/203 |
| 2007/0174541 | A1* | 7/2007 | Chandrasekaran et al. .. 711/100 |
| 2011/0173169 | A1 | 7/2011 | Chandrasekaran et al. |

FOREIGN PATENT DOCUMENTS

| | | |
|---|---|---|
| EP | 041282 A2 | 2/1992 |
| EP | 0 499 422 | 8/1992 |
| EP | 0642092 A2 | 8/1994 |
| EP | 0657813 A1 | 6/1995 |
| EP | 0750260 A2 | 12/1996 |
| EP | 1521184 A2 | 6/2001 |
| WO | WO 91/03024 | 3/1991 |
| WO | WO96/37837 A2 | 11/1996 |
| WO | WO 97/04384 A | 2/1997 |
| WO | WO 99/41664 | 8/1999 |
| WO | WO 99/44130 A | 9/1999 |
| WO | WO03003252 A1 | 1/2003 |
| WO | WO 2005/013155 A1 | 2/2005 |
| WO | WO 02/073416 A | 9/2007 |

OTHER PUBLICATIONS

C. Mohan et al., "A Case Study of Problems in Migrating to Distributed Computing: Data Base Recovery Using Multiple Logs in the Shared Disks Environment", IBM Research Center, Dated Mar. 1990, 20 pages.

Recovery and Coherency-Control Protocols for Fast Intersystem Page Transfer and Fine Granularity Locking in a Shared Disks Transaction Environment, C. Mohan and Inderpal Narang, Proceedings of the 17th International Conference on Very Large Data Bases, Barcelona, Sep. 1991, 15 pages.

Research Report RJ8017 entitled "Recovery and Coherency-Control Products for Fast Intersystem Page Transfer and Fine-Granularity Locking in a Shared Disks Transaction Environment", C. Mohan and Inderpal Narang, Data Base Technology Institute, IBM Almaden Research Center, dated Mar. 15, 1991, 36 pages.

C. Mohan, et al. "Solutions to Hot Spot Problems in a Shared Disks Transaction Environment", IBM Research Report RJ8281, Data Base Technology Institute, IBM Alamaden Research Center, Aug. 1991, 25 pages.

C. Mohan, et al. "Efficient Locking and Caching of Data in the Multisystem Shared Disks Transaction Environment", Proc. 3rd International Conference on Extending Technology, Viennia, dated Mar. 1992, 16 pages.

C. Mohan, et al. "Efficient Locking and Caching of Data in the Multisystem Shared Disks Transaction Environment", Data Base Technology Institute, IBM Almaden Research Center, RJ 8301, dated Aug. 1991, 20 pages.

C. Mohan, et al. "Data Base Recovery in Shared Disks and Client-Server Architectures", Proc. 12th International Conference on Distributed Computing Systems, Yokohama, dated Jun. 1992, 8 pages.

C. Mohan, et al. "Data Base Recovery in Shared in Shared Disks and Client-Server Architectures", IBM Research Report RJ8685, Data Base Technology Institute, IBM Almaden, IBM Almaden Research Center, Mar. 1992, 19 pages.

J.W. Josten, et al., "DB2's Use of the Coupling Facility for Data Sharing", IBM System Journal, vol. 36, No. 2, Dated 1997, 25 pages.

Hosmer, Hilary, "The Multipolicy Model; A Working Paper", Fourth RADC Database Security Workshop, Little Compton, Rhode Island, 20 pages, received Nov. 2001.

Abrams, Marshall et al., "Generalized Framework for Access Control: Towards Prototyping the ORGCON Policy," The MITRE Corporation, Bedford, MA, Dated Oct. 1991, 23 pages.

Rahm, Erhard, "Concurrency and Coherency Control in Data Sharing Systems" Technical report ZRI, Dec. 1991, Revised: Mar. 1993, 46 pages.

Rana Ejaz Ahmed, et al., "Cache-Aided Rollback Error Recovery (CARER) Algorithms for Shared-Memory Multiprocessor Systems," dated 1990, 8 pages.

Anne-Marie Kermarrec, et al. "A Recoverable Distributed Shared Memory Integrating Coherence and Recoverability,", Jun. 27, 1995, IEEE, XP 000597800, 10 pages.

Michael J. Feeley, et al., "Implementing Global Memory Management in a Workstation Cluster", SIGOPS dated 1995 Dec. 1995, XP 000584826, 12 pages.

Michael Donald Dahlin, "Serverless Network File Systems", dated 1995, 175 pages.

IBM Corporation, "Memory Queue Priority Mechanism for a RISC Processor,", IBM Technical Disclosure Bulletin, vol. 37, No. 06A, Jun. 1994, XP 000455787, 4 pages.

Stefanos Kaxiras, et al., "Improvng CC-NUMA Performance Using Instruction-Based Prediction," dated 1999, IEEE, 10 pages.

Alan L. Cox, et al., "Adaptive Cache Coherency for Detecting Migratory Shared Data," Dated 1993, IEEE, 12 pages.

Intersystem page Transfer and Fine-Granularity Locking in a Shard Disks Transaction Environment, C. Mohan and Inderpal Narang, Data Base Technology Institute , IBM Almaden Research Center, Dated Mar. 15, 1991, 38 pages.

Lory D. Molesky et al., "Database Locking Protocols for Large-Scale Cache-Coherent Shared Memory Multiprocessors: Design, Implementation and Performance," Jun. 6, 1995, 24 pages.

Lory D. Molesky et al., "Efficient Locking for Shared Memory Database Systems," Mar. 1994, 28 pages.

Norvag, Kjetil, "Issues in transaction-time temporal object database systems", Dated Oct. thru Dec. 2001, Journal of Database Management vol. 12, n4, 14 pages.

Triantafilllou, "Recovering in Large Distributed Systems with Replicated Data", Parallel and Distributed Information Systems, dated 1993., Proceedings of the second international conference on Jan. 20-22, 1993, 10 pages.

Abdallah, Maha et al., "One-Phase Commit: Does it Make Sense?" IEEE, dated 1998, 11 pages.

Chandrasekaran, Sashikanth et al., "Shared Cache—The Future of Parallel Databases", IEEE, dated 2003, 12 pages.

Samaras George et al., "Two-Phase Disturbed Commit Protocol for Main Memory Database Systems", IEEE, dated 1993, 10 pages.

Dye, Charles, Oracle Distributed Systems, Chapter 12—"Multi-Master Replication" (O'Reilly & Associates, Inc. © Apr. 1999), 31 pages.

Kirkland, Bob, Domino System Administration, Chapter 9—"Replication" (New Riders Publishing © 2000), 8 pages.

Mahapatra, Tushar et al., Oracle Parallel Processing, Chapter 12—"Application Fallover" (O'Reilly & Associates, Inc. © Aug. 2000), 5 pages.

Oracle Corporation, "Oracle8i Supplied Packages Reference, Release 8.1.5," Title page, Feb. 1999, located at http://www.csee.umbc.edu/help/oracle8/server.815/a68001/title.htm, 2 pages.

Oracle Corporation, "Oracle8i Supplied Packages Reference, Release 8.1.5," Table of Contents, Feb. 1999, located at http://www.csee.umbc.edu/help/oracle8/server.815/a68001/toc.htm, 22 pages.

Oracle Corporation, "DBMS_OFFLINE_OG," Oracle8i Supplied Packages Reference, Release 8.1.5, Feb. 1999, located at http://www.csee.umbc.edu/help/oracle8/server.815/a68001/dbms_off.htm, 7 pages.

Lee Inseon, et al., "A Single Phase Distributed Commit Protocol for Main Memory Database Systems", IEEE, dated 2002, 8 pages.

Feeley, Michael J. et al., "Integrating Coherency and Recoverability in Distributed Systems", www.usenix.org/publications, 14 pages, last accessed dated Nov. 29, 2006.

BMC, "Mainview for Network Management—Tame Your Wild TCP/IP Network", dated Apr. 25, 2004, www.documents.bmc.com/products, 6 pages.

Goyal, P. et al., "Evaluation of Object Placement Techniques in a Policy-Managed Storage System," www.lass.cs.umass.edu/papers, 22 pages, dated 2003.

Mohan, C. et al., "Efficient Locking and Caching of Data in the Multisystem Shared Disks Transaction Environment," *Proceedings of the Third International Conference on Extending Database Technology, Vienna*, Mar. 1992(16 pages).

* cited by examiner

LOCK MANAGER ON DISK

FIELD OF THE INVENTION

The present invention relates generally to database management systems. Specifically, the invention relates to lock management and distribution in high-availability clustered database management system (DBMS) environments.

BACKGROUND

Clustered database environments allow multiple instances of a relational database management system (RDBMS) running simultaneously on separate machines to access a single shared database, which may also be distributed. In such systems, a request may be made to any of the machines, and the data will be retrieved from the single database. Such systems provide high-availability, fault tolerance, consistency of data, load balancing, and scalability. An example of such an environment is Oracle Real Application Clusters (RAC) by Oracle Corporation, 500 Oracle Parkway, Redwood Shores Calif.

In one implementation of a clustered DBMS environment, each of the machines, or "nodes," includes a distributed lock manager (DLM) instance. DLM instances provide each DBMS instance with the ability to coordinate locking of and synchronize access to shared resources. DLM instances help to maintain concurrency on database resources, such as data blocks or files on a disk. Each node is connected to a set of shared disks that contains the database. Each database block is managed, or "mastered," by a particular node in the cluster called a "master node." If an RDBMS instance running on a first node needs to update a database block mastered by a second node, then the first node requests a lock from the master node (the second node), and the master node grants the requested lock to the first node.

In such an implementation, a disk may fail, but the DBMS instances may continue to successfully acquire locks on data blocks within the failed disk because the master of the failed disk continues to function, causing the node receiving the lock to assume that access is available to an unavailable resource. Likewise, the master may fail while the disk is available, causing the unavailability of a healthy shared disk for lack of a master capable of granting locks.

When a node in the cluster fails, it must be "fenced," or cut off from access to shared resources. This process is called IO fencing (Input/Output fencing). The failed instance must be fenced to keep leftover write operations from making changes to shared storage once the recovery process begins. Once the failed node or DBMS instance is isolated from the cluster, other instances may assume that the state of the disk will not be changed by the failed instance.

However, IO fencing may be impeded by an unresponsive instance that is holding an exclusive lock on a shared resource, but is not responding. Other instances, including the master of the shared resource, may not know if the unresponsive instance is dead or alive. This prevents other instances from determining whether the unresponsive node is performing IO (Input/Output) to the data block for which it holds an exclusive lock. This is particularly troublesome when the unresponsive node may be performing a write operation to the data block, because granting a lock to a new instance on the same block may result in corruption if both instances attempt to modify the block. The unresponsive node may require rebooting to ensure that no pending IO operations exist before granting a lock to another instance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, multiple master nodes exist in a database management system. A master node receives a lock request from a second node. The lock request is a request for a lock on a shared resource. The master node grants the lock request to the second node. While the second node holds the lock, the second node causes the master node to modify the shared resource.

In another embodiment, the master node receives a second lock request from a third node, requesting a lock on a second shared resource. The master node receives, from the second node, a request to modify the first shared resource. Subsequently, the master node receives, from the third node, a request to modify the second shared resource. The second shared resource is modified before the first shared resource.

In another embodiment, the second node generates an in-memory copy of the shared resource.

Structural and Functional Overview

Figure 1:
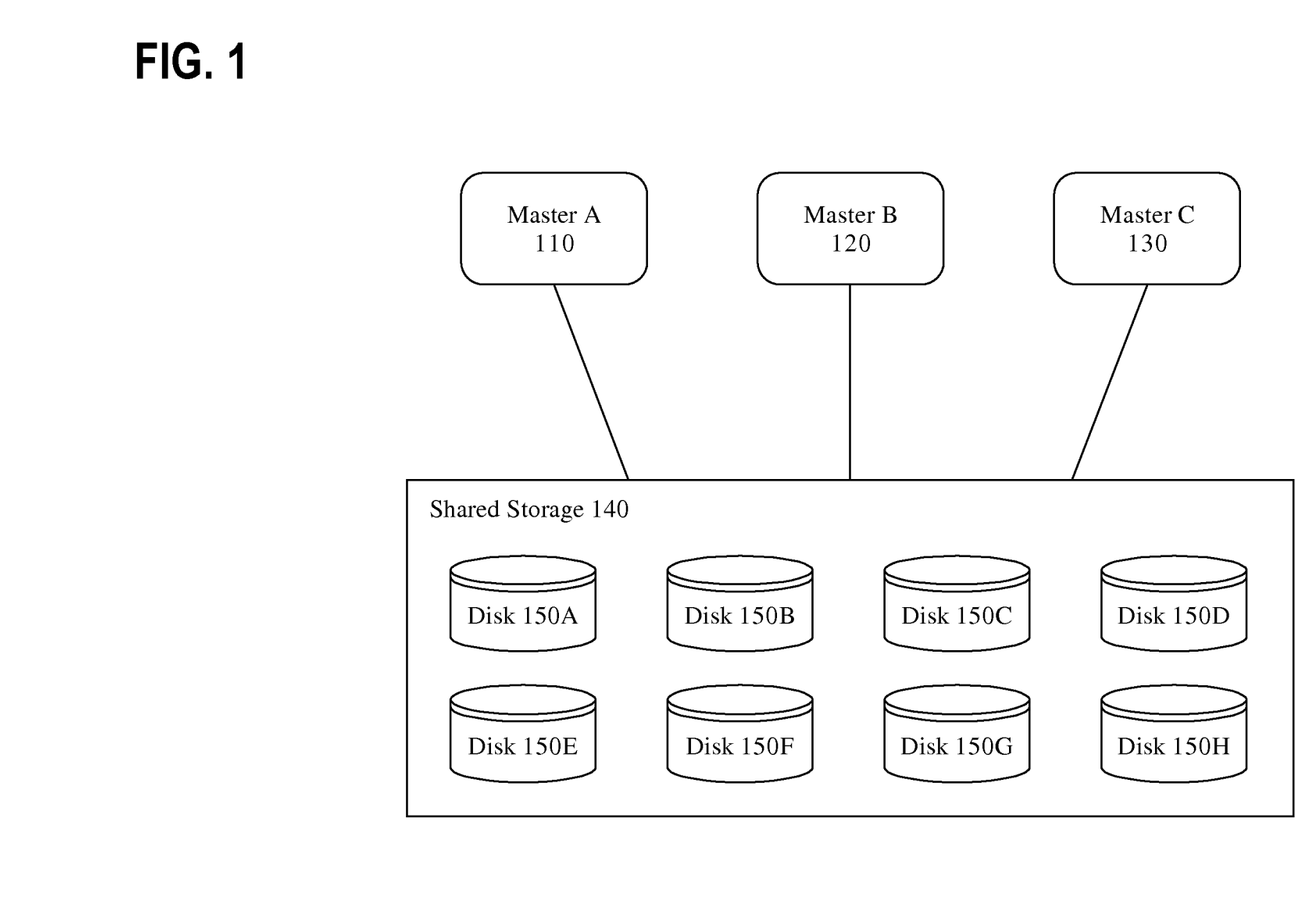
FIG. 1 is a block diagram illustrating an architecture on which an embodiment may be implemented.

FIG. 1 is a block diagram that illustrates an architecture on which an embodiment may be implemented. Three master nodes 110-130 are shown, and are communicatively coupled to one another. An embodiment may implement an architecture having more or fewer nodes. Also shown are individual hard disks 150A-150H. Disks 150A-150H make up shared storage 140. Each master node (master A, Master B, and Master C) is coupled to shared storage 140.

Each master node is capable of directly reading from and writing to shared storage 140. That is, each node in a shared storage system has access to the same data, and may read or write to the shared storage 140 without intervention by an intermediate node or management device. For example, master node 110 may directly request a data block from any disk 150A-150H in shared storage 140. Master node 110 can read the data block into its memory without making a request or receiving information from other nodes, such as nodes 120 and 130. That is to say that master node 110, having direct access to all shared storage resources, does not rely on another node such as node 120 read the data block into the memory of node 120. Rather, each master node has individual and equal access to all shared resources such as shared storage 140.

Each master node 110-130 includes a distributed lock manager (DLM) instance. In addition, each master node may also include an instance of a database management system (DBMS). In another embodiment, the DLM instance may be included on a node that does not include an instance of a DBMS. However, to simplify illustration, embodiments discussed hereinafter will be assumed to include a DLM instance and a DBMS instance on each master node.

The illustration of shared storage 140 in FIG. 1 is a logical representation. However, shared storage 140 is not limited to the embodiment shown. For example, it is conceivable that shared storage may include partitioned hard drives, or be made up of network-based storage devices or other memory products. As long as the relationship between the master nodes 110-130 and shared storage 140 allows each master node 110-130 to have shared access to shared storage 140, it does not matter what specific hardware or logic is used to make up the shared storage 140.

Figure 2:
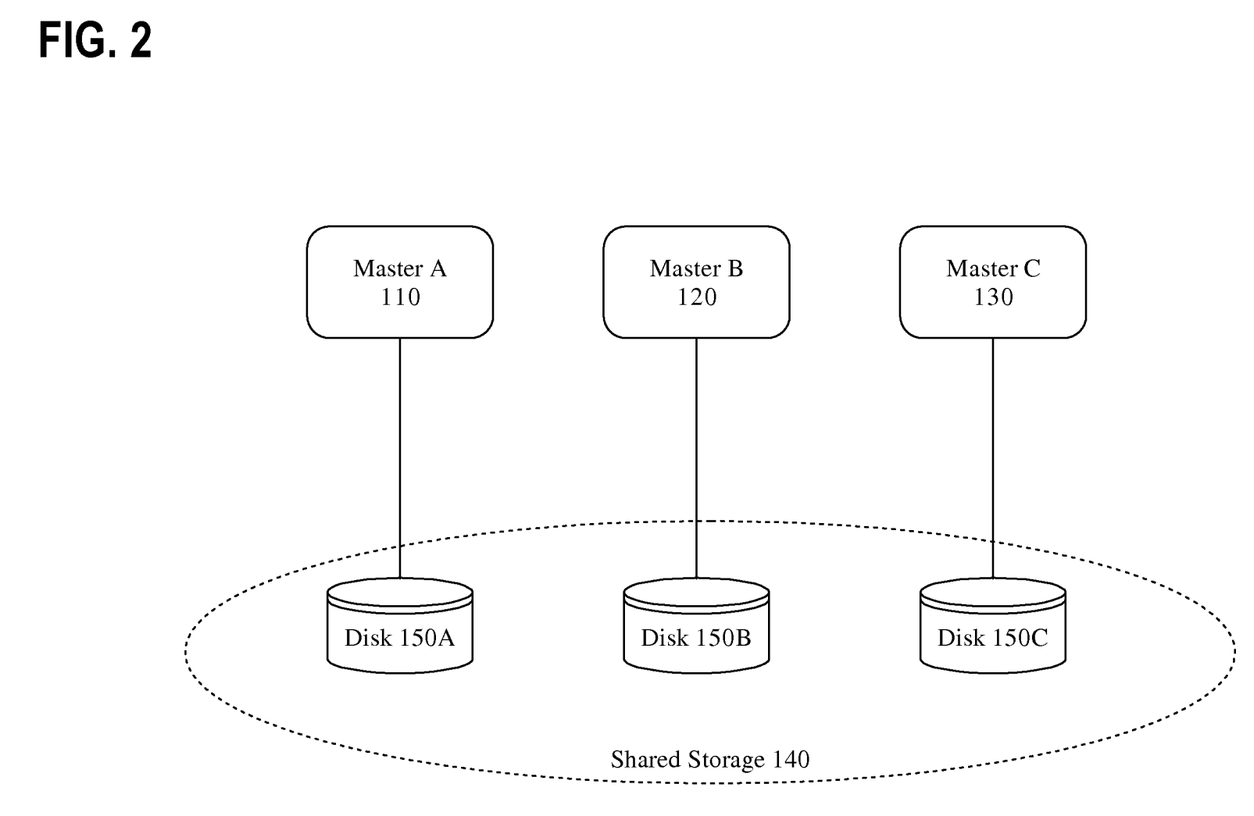
FIG. 2 is a block diagram illustrating an architecture on which an embodiment may be implemented.

FIG. 2 is a block diagram that illustrates a particular relationship between specific master nodes 110-130 and individual disks of FIG. 1. Master A 110 includes a DLM instance that has been assigned mastership over disk 150A. Master B 120 includes a DLM instance that has been assigned mastership over disk 150B. Master C 130 includes a DLM instance that has been assigned mastership over disk 150C.

Although the diagram of FIG. 2 shows a one-to-one relationship between master nodes 110-130 and disks 150A-150C, embodiments may include master nodes having mastership over more than one disk or individual partitions of a disk, not including an entire disk. An embodiment may include a master node on standby, with no mastership at all. In addition, a master node may be a virtual master node comprised of more than one physical node. To facilitate understanding, it may be assumed that other disks 150D-150H, which are not shown in FIG. 2, are managed by master nodes 110-130.

Figure 3:
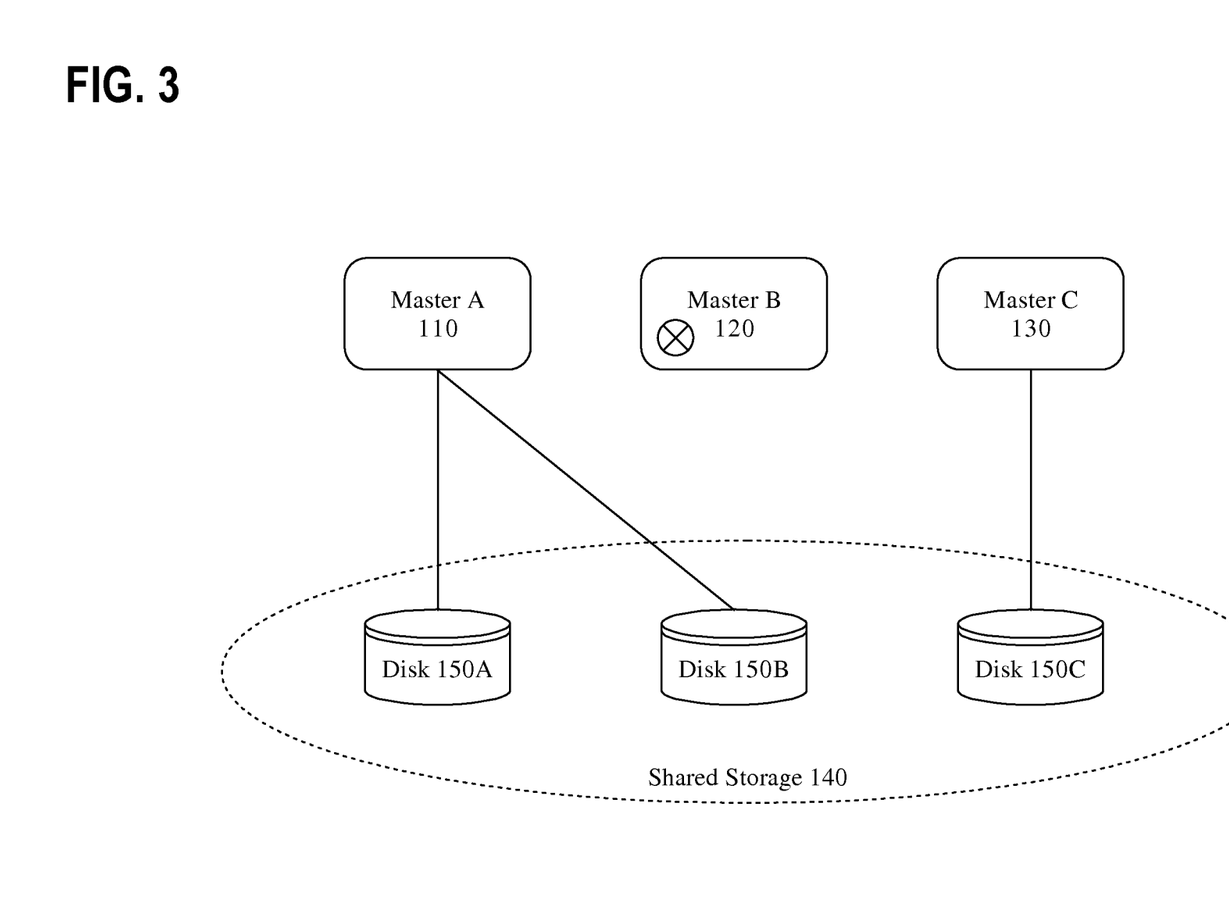
FIG. 3 is a block diagram illustrating an architecture on which an embodiment may be implemented.

FIG. 3 is a block diagram that illustrates the relationship between master nodes 110-130 and individual disks of FIG. 1 after master node B 120 has become unavailable. In this diagram, master node A 110 has assumed mastership over disk 1150B, and continues to serve as master node for disk 150A.

Each master node 110-130 is capable of directly accessing each disk 150A-150H in shared storage 140. However, as discussed hereinafter, nodes are configured to only directly access shared resources for which they have been assigned mastership. Master nodes are assigned mastership of shared resources, such as disks 150A-150H, data blocks, files, or any other resource that may be partitioned and managed in a lock-based system.

Master nodes 110-130 are communicatively coupled to one another. Master nodes assign locks to other nodes that request locks on shared resources controlled by the master nodes. For example, master C 130 may require access to a data block mastered by master A 110, such as a block on disk 150A. Master C 130 will request a lock on the block from master A 110.

Master nodes may also control all IO to and from resources that they manage. For example, even though master C 130 may obtain a lock on a data block managed by master A 110, master C 130 may be unable to write to the data block. Instead, master C 130 will ask master A 110 to perform the write operation on the block on behalf of master C 130.

Distributed Lock Manager

Database servers use resources while executing transactions. Even though resources may be shared between database servers, many resources may not be accessed in certain ways by more than one process at any given time. For example, resources such as data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to a resource. There are many types of locks. Some types of locks may be shared on the same resource by many processes, while other types of locks prevent any other locks from being granted on the same resource.

The entity responsible for granting locks on resources is referred to as a lock manager. In a single node database system, a lock manager will typically consist of one or more processes on the node. In a multiple-node system, such as a multi-processing machine or a local area network, a lock manager may include processes distributed over numerous nodes. A lock manager that includes components that reside on two or more nodes is referred to as a distributed lock manager (DLM) instance. Each component of a DLM is referred to herein as a DLM instance.

In an embodiment, each of a set of master nodes 110-130 includes an instance of a database management system (DBMS). Additionally, each master node 110-130 includes a distributed lock manager (DLM) instance. Each master node 110-130 is communicatively coupled to a shared storage 140, which stores a database that is shared amongst the master nodes 110-130.

Each DLM instance is configured as a master over a set of shared resources. For example, master node A 110 may be configured as master of disk 150A, master node B 120 may be configured as master of disk 150B, and master node C 130 may be configured as master of disk 150C. In embodiments, each DLM instance that is configured to be a master node 110-130 is configured with mastership over individual disks 150A-150H in a shared storage 140. In other embodiments, mastership may be based on more specific resources, such as data blocks or files.

Although an embodiment described herein has a single DLM instance and a single DBMS instance on each master node 110-130, no particular ratio is required. For example, the DBMS associated with one or more lock managers may reside on one or more nodes which include no DLM instance. In addition, a DLM instance may be distributed over more than one node when desired.

Configuration of mastership may be performed manually by a system administrator using a control panel. For example, a master control panel may provide logic for mapping each DLM instance to individual resources. Configuration of mastership may also occur automatically. For example, each master node 110-130 may communicate with each other node 110-130 to determine a distribution of resources. Mastership of resources may be determined based on the state of each node 110-130, response times associated with each machine 110-130, hardware attributes of each node 110-130, or other attributes providing a mechanism for determining distribution of resources, such as the relationship between a particular master node and a particular disk.

Once mastership has been distributed amongst DLM instances associated with individual master nodes 110-130, each DLM instance controls access to the resources for which it has authority. For example, a node that requires access to a data block which is controlled by master A 110 must ask master A 110 for a lock on that data block.

Each DLM instance stores data structures that indicate the locks held by other nodes of the system. If one database server requests a lock on a resource while another database server has a lock on the resource, the DLM instance must determine whether the requested lock is consistent with the granted lock. If the requested lock is not consistent with the granted lock, then the requester must wait until the database server holding the granted lock releases the granted lock.

In an embodiment, all access to a resource mastered by a master node must pass through that master node. For example, master A 110 may manage access to all data included in disk 150A, as shown in FIG. 2. Master C 130 may request an exclusive lock on a data block in disk 150A from master A 110. Once master A 110 determines that the granting of an exclusive lock on the requested block is consistent with other locks managed by master A 110, master A 110 grants the exclusive lock to master C 130. However, even armed with an exclusive lock, master C 130 may not directly access the data block. Instead, master C 130 must make all read and write requests to master A 110. Master A 110 will, in turn, perform any operations on the block on behalf of master C 130. This is the case even in a shared storage environment, where logical access to the block is available to master C 130, as shown in FIG. 2.

In other embodiments, particular types of operations may be allowed to bypass the master node that is managing the resource. New lock types may be defined to allow control of the locked resource to be relinquished to the holder of the lock. Existing lock types or resources may also be understood by the system to allow control of the locked resource to be relinquished. In such cases, the benefits of control over priority, recall operations, caching, and recovery and failover mechanisms described below are traded for the convenience that comes from direct control for particular lock types.

Priority-Based Flow Control

In an embodiment, all access to a resource mastered by a master node must pass through that master node. This enables a master node to distinguish between different types of traffic or different traffic attributes requiring access to the same resources.

Typically, if each node can unilaterally and directly perform operations on resources such as a shared storage 140, then each node would be treated equally, even though one node, such as master A 110, may be writing data that is more important than the data being written by master B 120.

Prioritization of flow control, such as writing operations, is possible when each master node controls the IO operations of disks for which it is master. The master node receiving a request to perform an operation on a disk, such as a write operation, may inspect attributes of the request to determine the priority of the request. These attributes may be well-known or custom request attributes, and may include an identifier representing the type of request or location at which the request is intended to be written or an expected completion time, as defined by the requester. The number of attributes on which a prioritization policy decision may be based is virtually unlimited.

An example of priority traffic is a request to write to the redo log. A request to write to the redo log may be considered a high priority because a transaction is not "committed" until the entry is made into the redo log. These entries are important because they are required by a DBMS for performing an instance recovery. During recovery, for example, the DBMS rolls forward (reapplies) to the data files all of the changes recorded in the redo log. In order to decrease the commit time for transactions, operations to write to the redo log may be considered a high priority, allowing these operations to be performed before other, less priority operations.

Caching at the Master Node

A master node may be configured to recognize data blocks that are requested frequently. These blocks are sometimes referred to as "hot blocks" because of the high demand associated with them. Since the master node is the only entity that controls access to the disk, then the DLM instance may cache these hot blocks in memory at the master node to reduce transaction times associated with disk IO operations.

When a master node receives a request for a lock on a shared resource, the master node may grant a lock on the cached version of the resource. At configured intervals or based on triggering events, the master node may then write the hot blocks to disk. The master node keeps track of whether or not the cache is up to date on the disk. Therefore, there is no need for cache validation with other systems, which would otherwise be required if multiple master nodes were allowed to access the disk without passing requests through the master of the resource.

Recall Operations and Failover

In an embodiment, a request may be recalled by the originator of the request. For example, master B 120, holding a lock on a resource mastered by master A 110, may make a request intended to cause master A 110 to write an updated version of the data block to the disk 150A on which the data block resides.

Subsequently, master B 120 may determine that the data block does not need to be written. For example, a change to the data block may not be required if a subsequent request to the DBMS altered the block to be identical to the previous version of the block. In such a case, the DBMS will recall the request, so that if the write operation has not been performed, it is removed from the queue.

Another reason for recall is that a DBMS may constantly be updating a particular block. If the same block is changed frequently over a short period of time, and no changes to the redo log are required, then the last copy is enough to keep the data in the database current. The DLM instance may therefore cancel all but the last change request associated with the particular data block, since each request includes an updated image of the entire block.

Recall operations are also useful as a form of IO fencing when an instance no longer performs any IO. For example, the DLM at master A 110 detects that master B, which holds a lock on a resource that is mastered by master A 110, is not responding. Master A 110 will then cut off master B 120 from any write operations and throw away the lock.

If a master node fails, blocking access to data managed by that master node, then a failover mechanism may be used. A duplicate master node may maintain lock and IO information, and may be promoted to primary master of the resource upon failure of the original master.

FIG. 3 illustrates a possible failover scenario. In the diagram, master B 120 becomes unresponsive, as denoted by the "X" symbol in the diagram. Subsequently, master A 110 assumes mastership over disk 150A, which was previously mastered by master B 120.

A master node may be deemed unresponsive based on a variety of factors. The mechanisms used to determine that a node is unresponsive or unavailable may vary from embodiment to embodiment. For example, master nodes may report, periodically, to a "voting disk" (not shown) by writing to the voting disk. A master node may be deemed unresponsive if it does not report to the other master disks via the voting disk within a preconfigured or predetermined amount of time. Master A 110 may retain a separate copy of lock information associated with master B 120. Master A 110 then assumes mastership over the resources previously associated with master B 120. Other master nodes, such as master C 130 which may have locks which were granted by master B 120 become aware that master B 120 is unresponsive via the voting disk or some other reporting mechanism, and therefore report to master A 110. Master C 130, for example, may begin making requests, which were previously directed to master B 120, to master A 110.

Master B 120, which is unresponsive, may have also been granted locks on blocks mastered by master A 110 and master C 130. In this case, upon detection of master B's 120 unresponsive or unavailable state, master A 110 and master c 130 will stop performing operations on behalf of master B 120 and will revoke the locks associated with master B 120.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
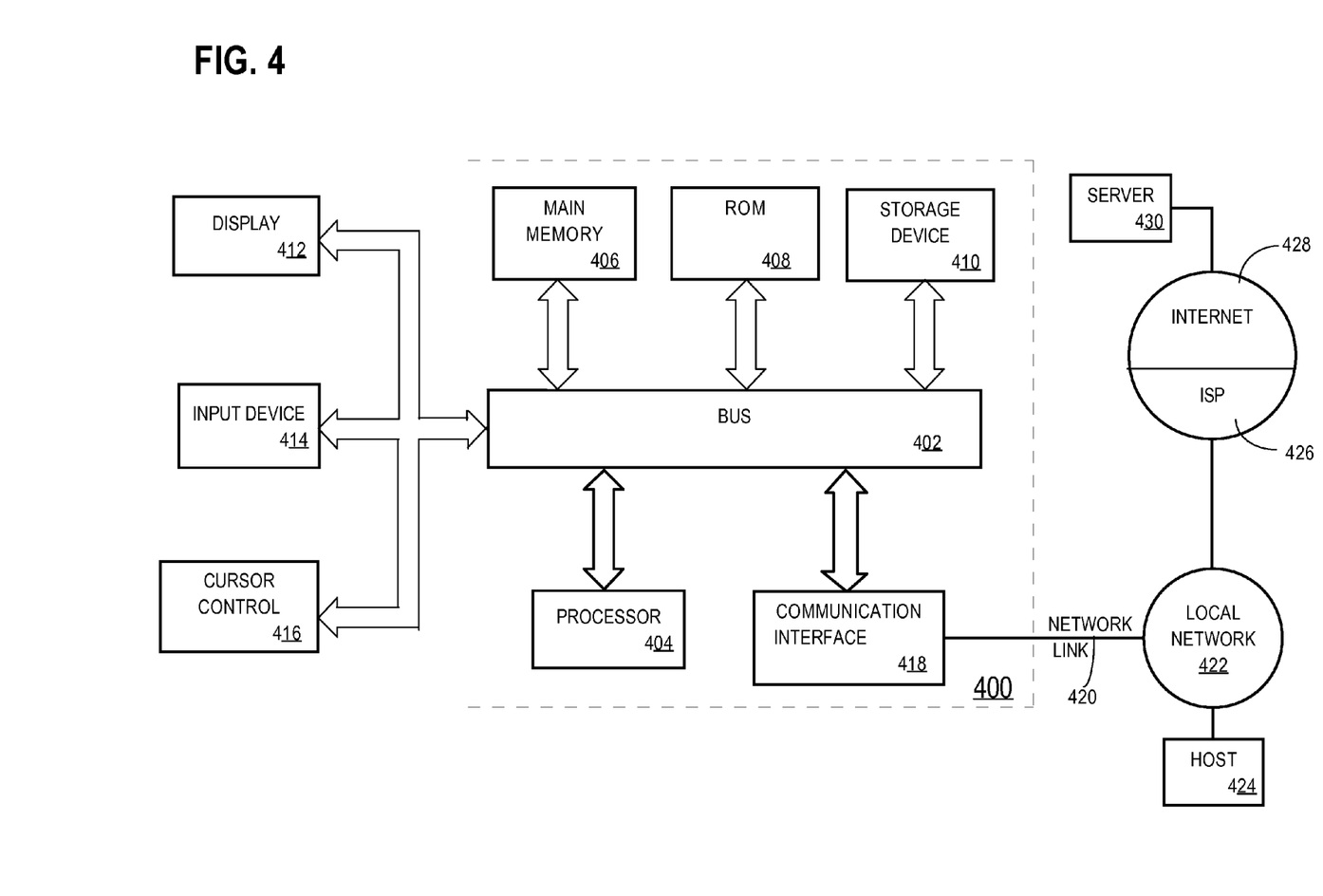
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of managing resources in a database management system, comprising:
   receiving, at a first master node of a plurality of master nodes, a first lock request from a second node, wherein the first lock request is a request for a lock on a first shared resource;
   wherein each master node of said plurality of master nodes has shared access to a plurality of shared resources;
   wherein each master node of said plurality of master nodes masters a respective subset of said plurality of shared resources;
   wherein said first shared resource belongs to a first subset of said plurality of shared resources that is mastered by said first master node;
   said first master node granting the lock to said second node;
   while said second node holds said lock, said second node causing said first master node to modify said first shared resource; and
   wherein the method is performed by one or more computing devices.

2. The method of claim 1, further comprising:
   receiving, at said first master node, a second lock request from a third node, wherein the second lock request is a request for a lock on a second shared resource;
   receiving a first modify request from said second node, wherein the first modify request is a request to modify said first shared resource;
   subsequent to receiving the first modify request, receiving a second modify request from said third node, wherein the second modify request is a request to modify said second shared resource; and
   modifying said second shared resource before modifying said first shared resource.

3. The method of claim 2, wherein each modify request comprises an expected completion time.

4. The method of claim 2, further comprising:
   based at least in part on a prioritization scheme, determining whether the first modify request or the second modify request should be honored first.

5. The method of claim 4, wherein the prioritization scheme is based on one or more of: a) an expected completion time associated with the request; b) priority attributes associated with the request's type; or c) a network or system state.

6. The method of claim 1, further comprising:
   receiving a second modify request from said second node, wherein the second modify request is a request to modify said first shared resource; and
   subsequent to receiving the second modify request, receiving a first recall request from said second node, wherein the first recall request causes said first master node to refrain from modifying a second shared resource.

7. The method of claim 1, further comprising:
   caching said first shared resource at said first master node;
   receiving a second modify request from said second node, wherein the second modify request is a request to modify said first shared resource; and
   modifying the cached copy of said first shared resource.

8. The method of claim 1, further comprising:
   said first master node assuming mastership over said first shared resource, wherein said first shared resource was previously managed by a third master node of said plurality of master nodes.

9. The method of claim 8, wherein the step of said first master node assuming mastership over said first shared resource is performed in response to detecting a state of the third master node.

10. The method of claim 1, further comprising:
    the second node generating an in-memory copy of said first shared resource.

11. A non-transitory computer-readable storage medium storing instructions which, when executed, cause one or more processors to perform the steps of:

receiving, at a first master node of a plurality of master nodes, a first lock request from a second node, wherein the first lock request is a request for a lock on a first shared resource;

wherein each master node of said plurality of master nodes has shared access to a plurality of shared resources;

wherein each master node of said plurality of master nodes masters a respective subset of said plurality of shared resources;

wherein said first shared resource belongs to a first subset of said plurality of shared resources that is mastered by said first master node;

said first master node granting the lock to said second node; and while said second node holds said lock, said second node causing said first master node to modify said first shared resource.

12. The computer-readable storage medium of claim 11, wherein the instructions further include instructions for:

receiving, at said first master node, a second lock request from a third node, wherein the second lock request is a request for a lock on a second shared resource;

receiving a first modify request from said second node, wherein the first modify request is a request to modify said first shared resource;

subsequent to receiving the first modify request, receiving a second modify request from said third node, wherein the second modify request is a request to modify said second shared resource; and modifying said second shared resource before modifying said first shared resource.

13. The computer-readable storage medium of claim 11, wherein the instructions further include instructions for:

based at least in part on a prioritization scheme, determining which modify request should be honored first.

14. The computer-readable storage medium of claim 12, wherein the instructions further include instructions for:

based at least in part on a prioritization scheme, determining whether the first modify request or the second modify request should be honored first.

15. The computer-readable storage medium of claim 14, wherein the prioritization scheme is based on one or more of: a) an expected completion time associated with a request; b) priority attributes associated with the request's type; or c) a network or system state.

16. The computer-readable storage medium of claim 11, wherein the instructions further include instructions for:

receiving a second modify request from said second node, wherein the second modify request is a request to modify said first shared resource; and subsequent to receiving the second modify request, receiving a first recall request from said second node, wherein the first recall request causes said first master node to refrain from modifying a second shared resource.

17. The computer-readable storage medium of claim 11, wherein the instructions further include instructions for:

caching said first shared resource at said first master node;

receiving a second modify request from said second node, wherein the second modify request is a request to modify said first shared resource; and modifying the cached copy of said first shared resource.

18. The computer-readable storage medium of claim 11, wherein the instruction further include instructions for:

said first master node assuming mastership over said first shared resource, wherein said first shared resource was previously managed by a third master node of said plurality of master node.

19. The computer-readable storage medium of claim 18, wherein the step of said first master node assuming mastership over said first shared resource is performed in response to detecting a state of the third master node.

20. The non-transitory computer-readable storage medium of claim 11, further storing instructions which, when executed, cause the one or more processors to perform the steps of:

the second node generating an in-memory copy of said first shared resource.

* * * * *

UNITED STATES PATENT AND TRADEMARK OFFICE
CERTIFICATE OF CORRECTION

PATENT NO. : 8,510,334 B2  
APPLICATION NO. : 12/613502  
DATED : August 13, 2013  
INVENTOR(S) : Chan et al.

Page 1 of 2

It is certified that error appears in the above-identified patent and that said Letters Patent is hereby corrected as shown below:

On title page 3, column 1, under other publications, line 17, delete "Alamaden" and insert -- Almaden --, therefor.

On title page 3, column 1, under other publications, line 21, delete "Viennia," and insert -- Vienna, --, therefor.

On title page 3, column 2, under other publications, line 24, delete ""Improvng" and insert -- "Improving --, therefor.

On title page 3, column 2, under other publications, line 37, delete "temploral" and insert -- temporal --, therefor.

On title page 3, column 2, under other publications, line 40, delete "Triantafilllou," and insert -- Triantafillou, --, therefor.

In the Specification

In column 3, line 49, delete "1150B," and insert -- 150B, --, therefor.

In the Claims

In column 11, line 36-39, in Claim 13, delete "claim 11, wherein the instructions further include instructions for: based at least in part on a prioritization scheme, determining which modify request should be honored first." and insert -- claim 12, wherein each modify request comprise an expected completion time. --, therefor.

Signed and Sealed this
Twenty-sixth Day of August, 2014

Michelle K. Lee
*Deputy Director of the United States Patent and Trademark Office*

In column 12, line 25, in Claim 18, delete "instruction" and insert -- instructions --, therefor.

In column 12, line 30, in Claim 18, delete "node." and insert -- nodes. --, therefor.